Feb. 21, 1939.  C. DREXLER  2,147,832

ANGULAR DRIVING MECHANISM

Filed May 7, 1938

INVENTOR.
Charles Drexler

Patented Feb. 21, 1939

2,147,832

UNITED STATES PATENT OFFICE 2,147,832

ANGULAR DRIVING MECHANISM

Charles Drexler, Indianapolis, Ind.

Application May 7, 1938, Serial No. 206,623

5 Claims. (Cl. 74—423)

This invention relates to angular driving mechanism in which rotation is transmitted through bevel gears from a driving shaft to a second or driven shaft mounted at an angle to the driving shaft.

An object of the invention is to provide a compact mechanism of few parts and low cost of manufacture.

Another object is to provide a mechanism that will operate over long periods with negligible wear from heavy end thrusts.

Another object is to provide a mechanism adaptable to devices for drilling and performing other operations in limited spaces.

Figure 1:
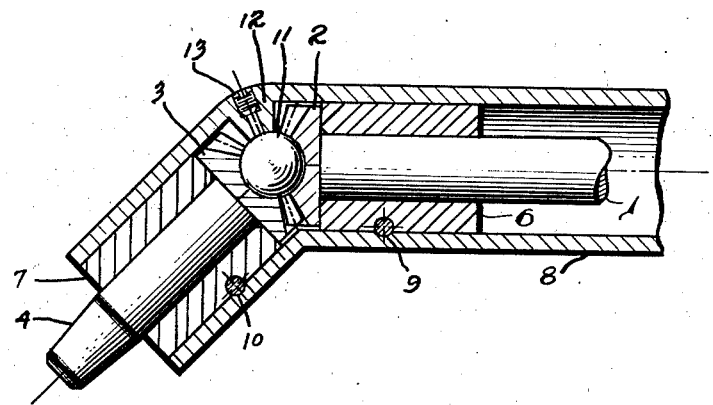
Figure 2:
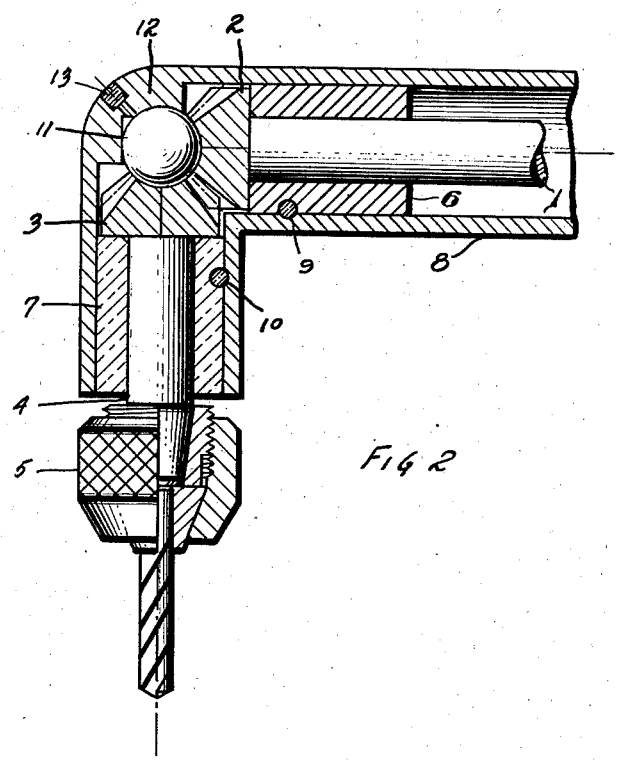

In the drawing Figure 1 shows an example of the mechanism in sectional elevation with the shafts operating at an angle of 45 degrees. Figure 2 is similar example with the shafts at right angles.

In both drawings 1 is the driving shaft and integral therewith or secured thereto is the driving gear 2. 3 is a mating gear integral with or secured to the driven shaft 4. In Figure 2 the driven shaft 4 is shown with a chuck 5 for holding a drill or other tool. Combination journal and end thrust bearing members 6 and 7 are provided for the shafts 1 and 4 and also for receiving the outward end thrust of the gears 2 and 3. Encasing the gears 2 and 3, shafts 1 and 4 and the journal bearing members 6 and 7 is the housing 8, suitably bored to position the journal bearings in proper alignment. Pins 9 and 10 are provided to secure the journal bearings in place.

Within the bend of the housing 8 and between the gears 2 and 3 is positioned a ball 11 fitting concave surfaces formed in the small ends of the gears and also fitting another concave surface on a lug 12 projecting inwardly in the housing 8.

The purpose of the ball 11 is to position gears 2 and 3 in proper relation endwise and resist inward end thrust. An opening 13 shown is for introducing lubricant.

When mechanism of this type is used for drilling and certain other devices, the end thrust on the driven shaft is often very heavy and the cause of rapid wear, but I have found a single ball, preferably of hardened steel, mounted as shown provides a compact and inexpensive arrangement and practically eliminates this wear.

What I claim as new is:

1. In angular driving mechanism, a driving shaft, a driven shaft, means for supporting said shafts in operative position, meshing bevel gears mounted on the shafts and a single ball in contact with the supporting means and said gears.

2. In angular driving mechanism, a driving shaft, a driven shaft, means for supporting said shafts in operative position, meshing bevel gears mounted on the shafts and a single ball in contact with the supporting means and the small ends of said gears.

3. In angular driving mechanism, a driving shaft, a driven shaft, means for supporting said shafts in operative position, meshing bevel gears mounted on the shafts and provided with ball seats, a cooperative ball seat provided by the supporting means and a single ball mounted in said ball seats.

4. In angular driving mechanism, a driving shaft, a driven shaft, means for supporting said shafts in operative position, meshing bevel gears mounted on the shafts and provided with concave pockets, a cooperative concave pocket on the supporting means and a single ball within the said pockets.

5. In angular driving mechanism, a driving shaft, a driven shaft, means for supporting said shafts in operative position, meshing bevel gears mounted on the shafts and provided with concave pockets on their small ends, a cooperative concave pocket on the supporting means and a single ball within the said pockets.

CHARLES DREXLER.